(12) United States Patent
Yu et al.

(10) Patent No.: US 8,221,143 B2
(45) Date of Patent: Jul. 17, 2012

(54) ELECTRONIC CARD CONNECTOR WITH A LIMITING WALL FOR LIMITING AN ELECTRONIC CARD OBLIQUELY INSERTED THEREIN

(75) Inventors: Jian-Fei Yu, Kunshan (CN); Wen-Yu Liu, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 465 days.

(21) Appl. No.: 12/570,155

(22) Filed: Sep. 30, 2009

(65) Prior Publication Data

US 2010/0087074 A1    Apr. 8, 2010

(30) Foreign Application Priority Data

Oct. 7, 2008 (CN) .......................... 2008 2 0161550

(51) Int. Cl.
*H01R 13/62* (2006.01)
(52) U.S. Cl. .......................................... 439/159; 439/81
(58) Field of Classification Search ........................ None
See application file for complete search history.

(56) References Cited

U.S. PATENT DOCUMENTS

| 6,851,959 | B2* | 2/2005 | Ooya et al. | 439/159 |
| 6,951,471 | B1* | 10/2005 | Chen | 439/159 |
| 7,070,430 | B2* | 7/2006 | Yang et al. | 439/159 |
| 7,361,035 | B1* | 4/2008 | Lai | 439/155 |
| 7,484,976 | B2* | 2/2009 | Ezaki | 439/159 |
| 7,637,759 | B2* | 12/2009 | Kobayashi et al. | 439/159 |
| 7,651,351 | B2* | 1/2010 | Yen et al. | 439/159 |
| 7,658,638 | B2* | 2/2010 | Motojima | 439/377 |
| 7,670,160 | B2* | 3/2010 | Tsuji | 439/159 |

* cited by examiner

*Primary Examiner* — Michael Zarroli
(74) *Attorney, Agent, or Firm* — Wei Te Chung; Andrew C. Cheng; Ming Chieh Chang

(57) ABSTRACT

An electronic card connector (100) defining a receiving space (10) and includes an insulative housing (1), a number of contacts (2) and an ejecting mechanism (3) retained in the insulative housing (1), and a metal shell (5). The ejecting mechanism (3) includes a slider (31) and a latch strip (34) fixed on the slider (31). The latch strip (34) has a retention portion (341) retained on the slider (31) and a spring arm (343) extending sidewardly. The spring arm (343) has an arm portion (3431) and a resistive portion (3432) extending sidewardly. The resistive portion (3432) is offset from the arm portion (3431) along a width direction. The metal shell (5) has a limiting wall (55) extending into the receiving space (10) for protecting the spring arm (343) from being resisted overly by an electronic card. The limiting wall (55) defines a plane which is located between that of the resistive portion (3432) and arm portion (3431).

8 Claims, 6 Drawing Sheets

ELECTRONIC CARD CONNECTOR WITH A LIMITING WALL FOR LIMITING AN ELECTRONIC CARD OBLIQUELY INSERTED THEREIN

BACKGROUND OF THE INVENTION

1. Field of the Invention

The present invention relates to an electronic card connector, more particularly to an electronic card connector with a limiting wall for limiting an electronic card obliquely inserted therein.

2. Description of Related Art

Usually, electronic device such as digital camera and PDA deploys an electronic card for increasing the storage of the device. An electronic card connector is used for connecting the electronic card to the electronic device. Electronic card connector in early stage just comprises an insulative housing, a plurality of terminals for contacting with an electronic card, and a metal shell covering the insulative housing, and a part of the electronic card exposes to the outside of the connector for ejecting itself conveniently. Indeed, some electronic card connectors include a push-push type ejecting mechanism for pushing the electronic card into or out of the electronic card connectors, and a lock device for holding the electronic card in the connector and avoiding the electronic card from drawing out of the connector by mistake. The electronic card has a cutout at one side thereof for receiving the lock device to lock the electronic card into the electronic card connector.

The lock device is made of a piece of metal sheet. The ejecting mechanism has a slider which can moves along an insertion direction of the electronic card. The slider defines a slot opening at one side thereof The lock device has a retention portion retained in the slot and a spring arm extending sidewardly. The spring arm has a lock portion for locking electronic card. When the electronic card is inserted into the electronic card connector obliquely, the lock portion would be resisted and moves sidewardly, and when the users keep on inserting the electronic card obliquely, the lock portion would be distorted via resisting overly and can not lock the electronic card.

Hence, an improved electronic card connector is desired to overcome the above problems.

BRIEF SUMMARY OF THE INVENTION

According to one aspect of the present invention, an electronic card connector defining a receiving space for receiving an electronic card, comprises an insulative housing, a number of contacts retained in the insulative housing, an ejecting mechanism retained in the insulative housing and a metal shell covering the insulative housing. The ejecting mechanism comprises a movable slider retained in the insulative housing and a latch strip fixed on the slider. The slider defines a positioning slot. The latch strip has a retention portion retained in the positioning slot and a spring arm extending sidewardly and forwardly. The spring arm has an arm portion and a resistive portion extending sidewardly into the receiving space for locking the electronic card. The resistive portion defines a plane along a front to back direction and is offset from the arm portion along a width direction of the insulative housing. The metal shell has a limiting wall extending into the receiving space for protecting the spring arm from being resisted overly by the electronic card. The limiting wall defines a plane which is located between that of the resistive portion and arm portion.

According to another aspect of the present invention, an electronic card connector defining a receiving space for receiving an electronic card, comprises: an insulative housing, a plurality of contacts retained in the insulative housing and an ejecting mechanism retained in the insulative housing. The insulative housing defines a recess at one side thereof. The ejecting mechanism has a slider retained in the recess and a latch strip fixed on the slider. The latch strip has an arm portion mounted on the slider and a resistive portion extending sidewardly from the arm portion for locking with the electronic card. The electronic card connector further comprises a limiting wall located at a rear side of the resistive portion and an inner side of the arm portion for protecting the latch strip from destroyed when the electronic card is inserted into the receiving space obliquely.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
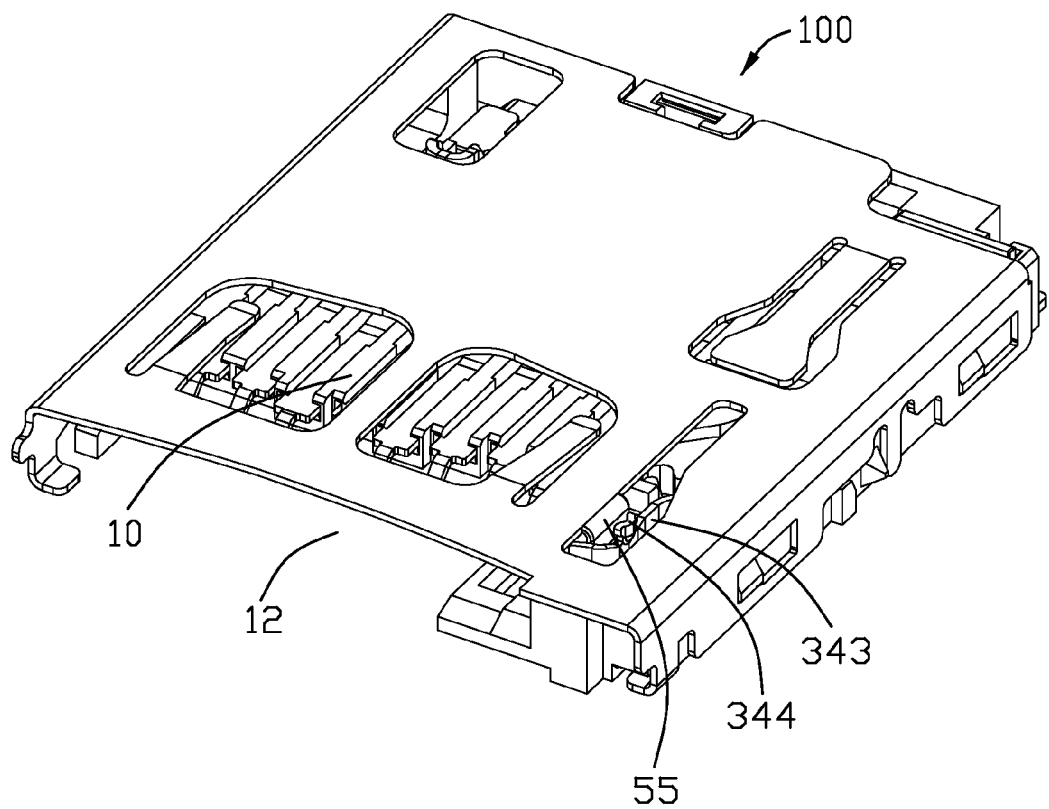
FIG. 1 is a perspective view of an electronic card connector according to the present invention.
Figure 2:
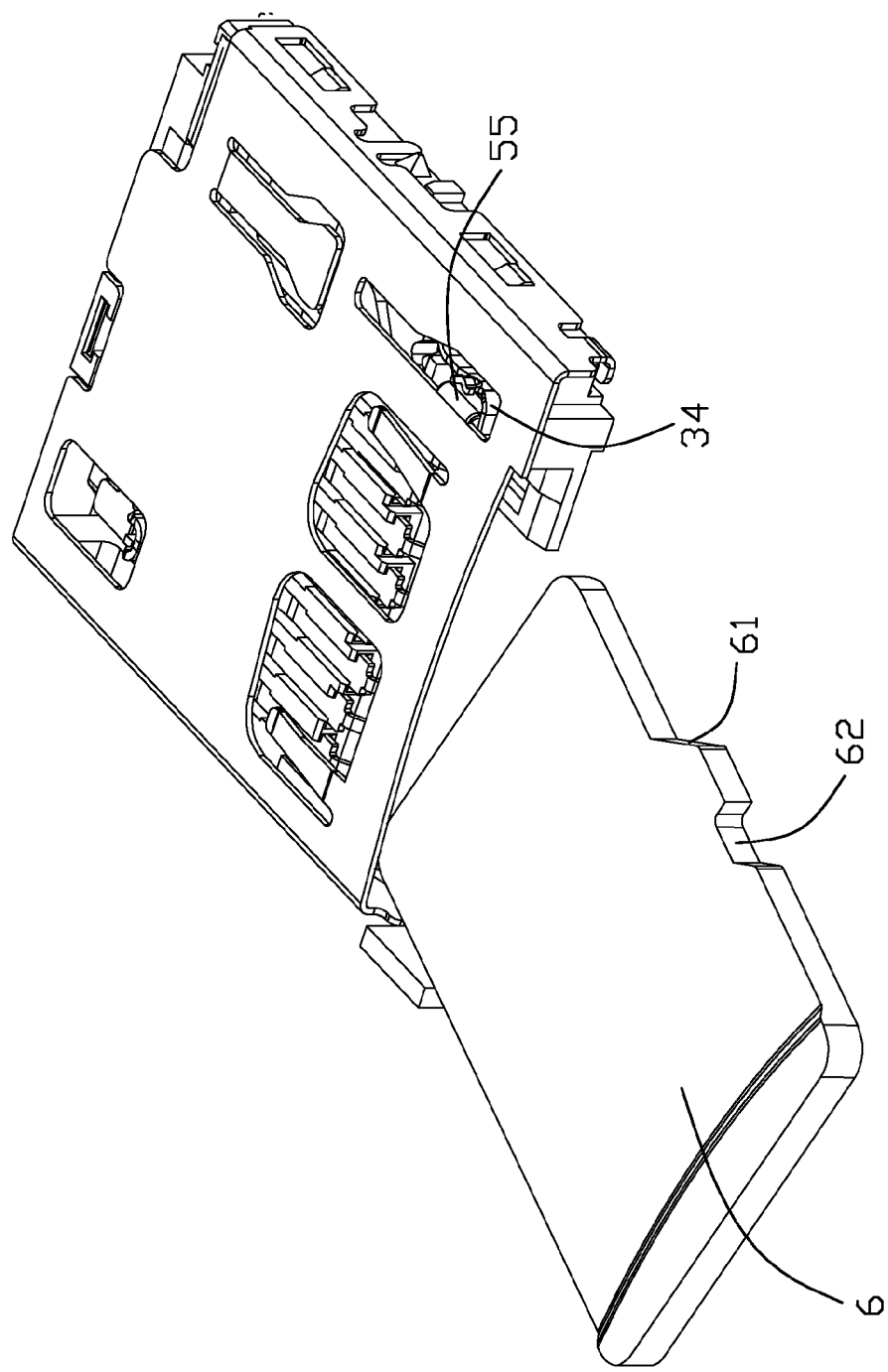
FIG. 2 is a perspective view of the electronic card connector with an electronic card which is initially inserted obliquely into the electronic card connector.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-6, an electronic card connector 100 for connecting with an electronic card 6 comprises an insulative housing 1, a plurality of contacts 2 and a pair of switch contacts 4 retained in the insulative housing 1, a push-push type ejecting mechanism 3 fixed in the insulative housing 1 and a metal shell 5 covering the insulative housing 1. The electronic card 6 in the present invention is a micro SD card and has an inclined plane 61 and a cutout 62 at one side thereof The electronic card connector 100 defines a receiving space 10 for receiving the electronic card 6.

Figure 3:
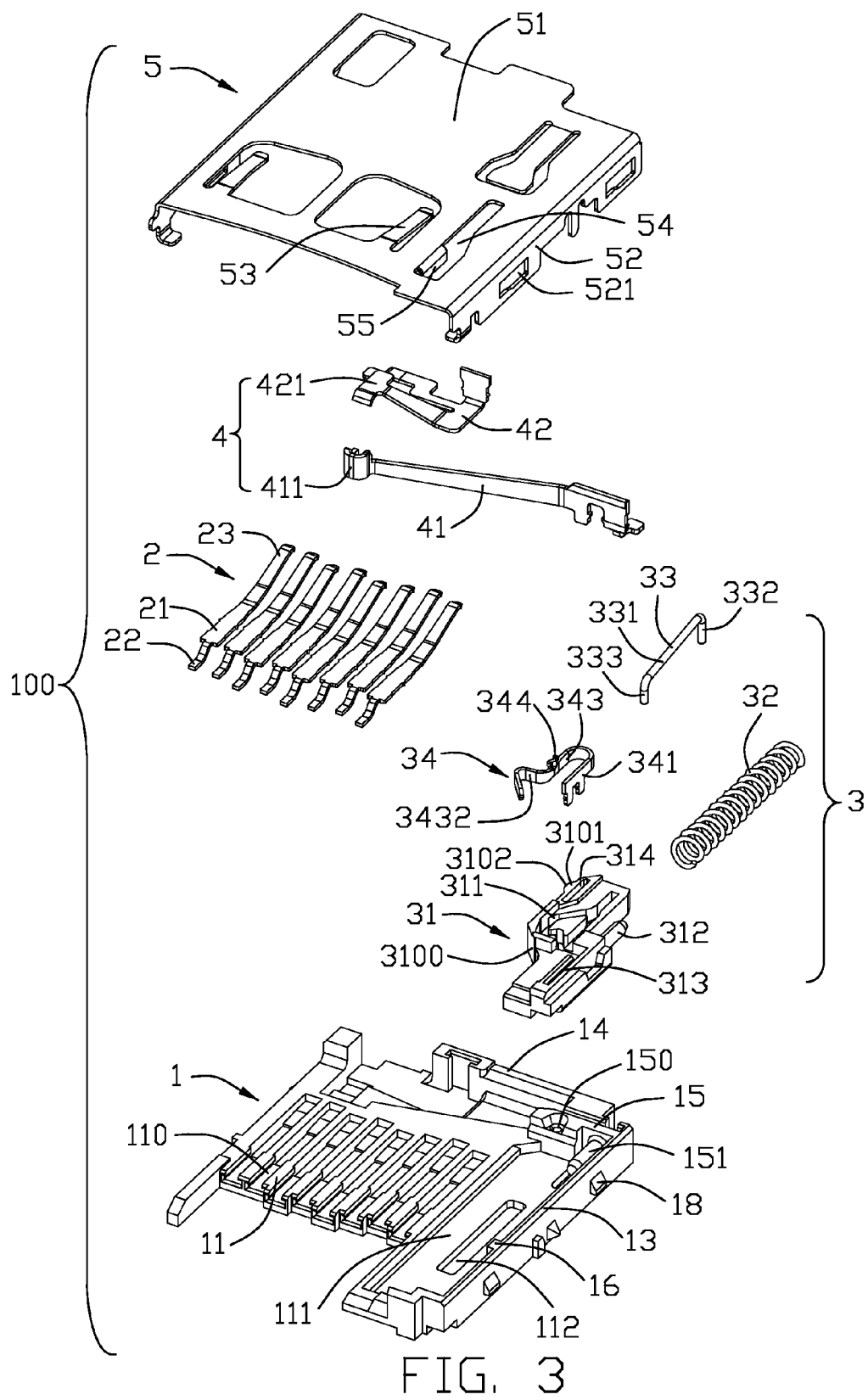
FIG. 3 is an exploded view of the electronic card connector shown in FIG. 1.
Figure 4:
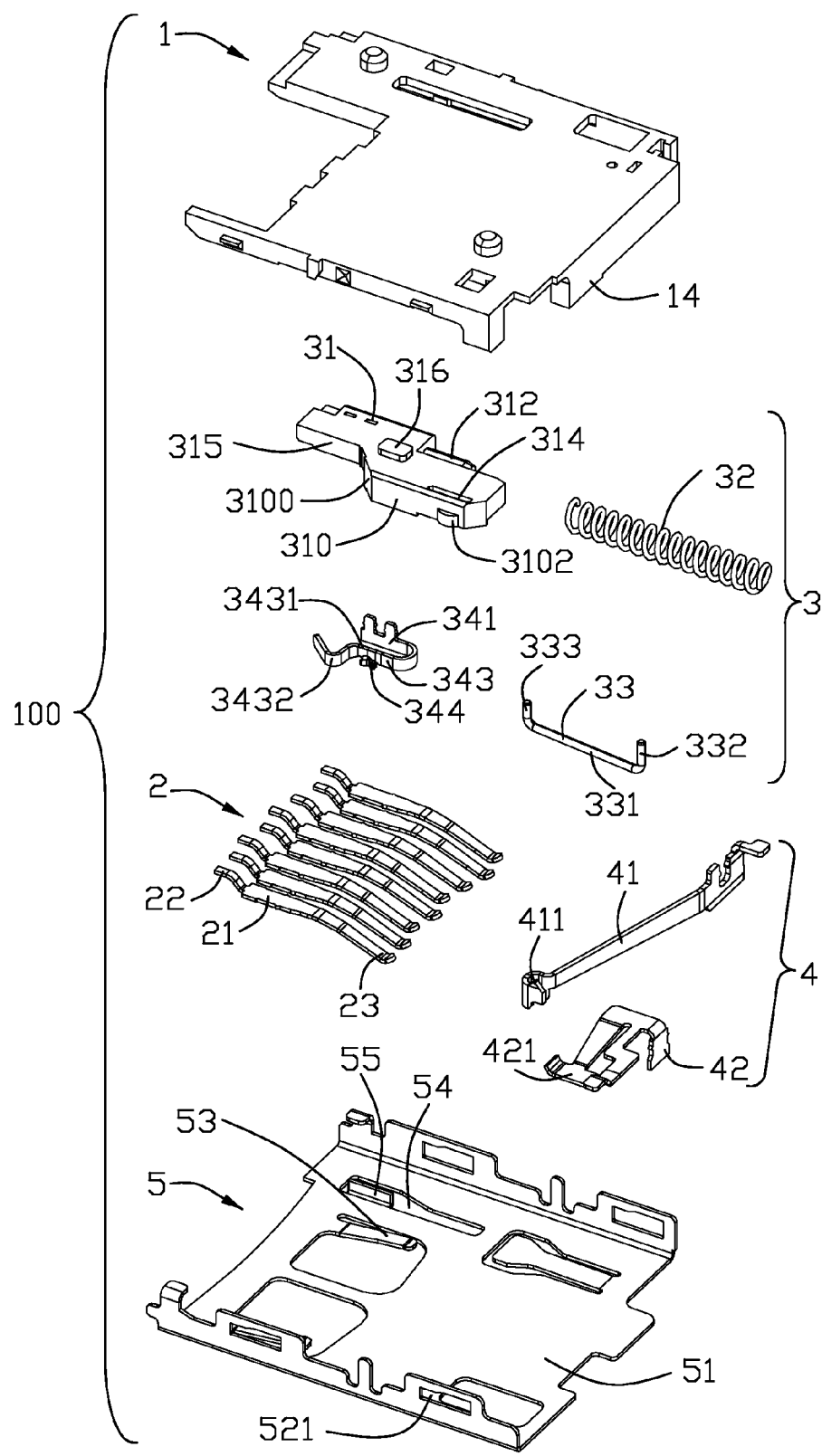
FIG. 4 is a view similar to FIG. 3, while taken from a different aspect.

Referring to FIGS. 3-4, The insulative housing 1 has a bottom wall 11, a side wall 13 extending upwardly from one side of the bottom wall 11 and a rear wall 14 extending upwardly from a rear end of the bottom wall 11. The insulative housing 1 defines an inserting opening 12 at another end of the bottom wall 11 opposed to the rear wall 14. The bottom wall 11 defines a plurality of passageways 110 for fastening the contacts 4 therein, a recess 111 located between the passageways 110 and the side wall 14 for receiving the ejecting mechanism 3, and a slot 112 extending therethrough along an up to down direction and communicating with the recess 111. The side wall 13 has a projection 16 extending sidewardly for preventing the ejecting mechanism 3 from moving upwardly.

The insulative housing 1 has a middle wall 15 located at a rear side of the recess 111 and parallel to the rear wall 14. The middle wall 15 defines a positioning hole 150 and a first post 151 extending forwardly. The insulative housing 1 has a plurality of protrusions 18 at two sides thereof for engaging with the metal shell 5.

Each contact 2 has a securing portion 21 retained in the passageways 110, a contact portion 23 and a soldering portion 22 extending oppositely from two ends of the securing portion 21 respectively. The contact portion 23 extends into the receiving space 10 for connecting with the electronic card 6.

The push-push type ejecting mechanism 3 comprises a movable slider 31 retained in the recess 111, a spring 32 urging the slider 31 forwardly and a pole 33 retained between the middle wall 15 and the slider 31, and a latch strip 34 fixed on the slider 31.

The slider 31 has a first inner side wall 315, a second inner side wall 310 at an inner side of the first inner side wall 315, and an inclined wall 3100 connecting the first inner side wall 315 and second inner side wall 310. The first inner side wall 315 and the second inner side wall 310 abut against a side of the electronic card 6. The inclined wall 3100 abuts against the inclined plane 61. The slider 31 defines a heart-shaped recess 311 at an upper position thereof, a second post 312 at an outer side of the heart-shaped recess 311, a positioning slot 313 located at a front side of the second post 312, and an opening 314 extending therethrough along an up to down direction to form a resilient wall 3101. The resilient wall 3101 has an emboss 3102 extending sidewardly into the receiving space 10 for abutting against a front side the electronic card 6. The slider 31 has a block 316 at a lower side thereof for engaging with the slot 112 and moving in the slot 112 along a front to back direction. The spring 32 has one end ringed on the first post 151, and another end ringed on the second post 312 for positioning the spring 32 between the middle wall 15 and the slider 31. The pole 33 has a base portion 331 and a pair of flanges 332, 333 extending downwardly from two ends of the base portion 331. One flange 332 is retained in the positioning hole 150, and another flange 333 is located at the heart-shaped recess 311 and can move in the heart-shaped recess 311 when the electronic card 6 is inserted into or ejected from the receiving space 10.

The latch strip 34 has a retention portion 341 retained in the positioning slot 313 and a spring arm 343 bending sidewardly and forwardly from a rear end of the retention portion 341. The spring arm 343 has an arm portion 3431 connecting with the retention portion 341 and a resistive portion 3432 extending sidewardly into the receiving space 10 from the arm portion 3431 for locking the electronic card 6. The resistive portion 3432 defines an inner apex which is offset from the arm portion 3431 along a width direction of the insulative housing 1. The arm portion 3431 has an arc tab 344 extending upwardly.

The switch contacts 4 are retained in a rear side of the insulative housing 1 and comprise a first contact 41 retained between the rear wall 14 and the middle wall 15, and a second contact 42 retained on the rear wall 14 and extending to the bottom wall 11. The first contact 41 has a first contact portion 411, and the second contact 42 has a second contact portion 421 which can moves along the front to back direction to connect or disconnect with the first contact portion 411 along the up to down direction for examining that whether the electronic card 6 is inserted into the receiving space 10 or not.

Figure 5:
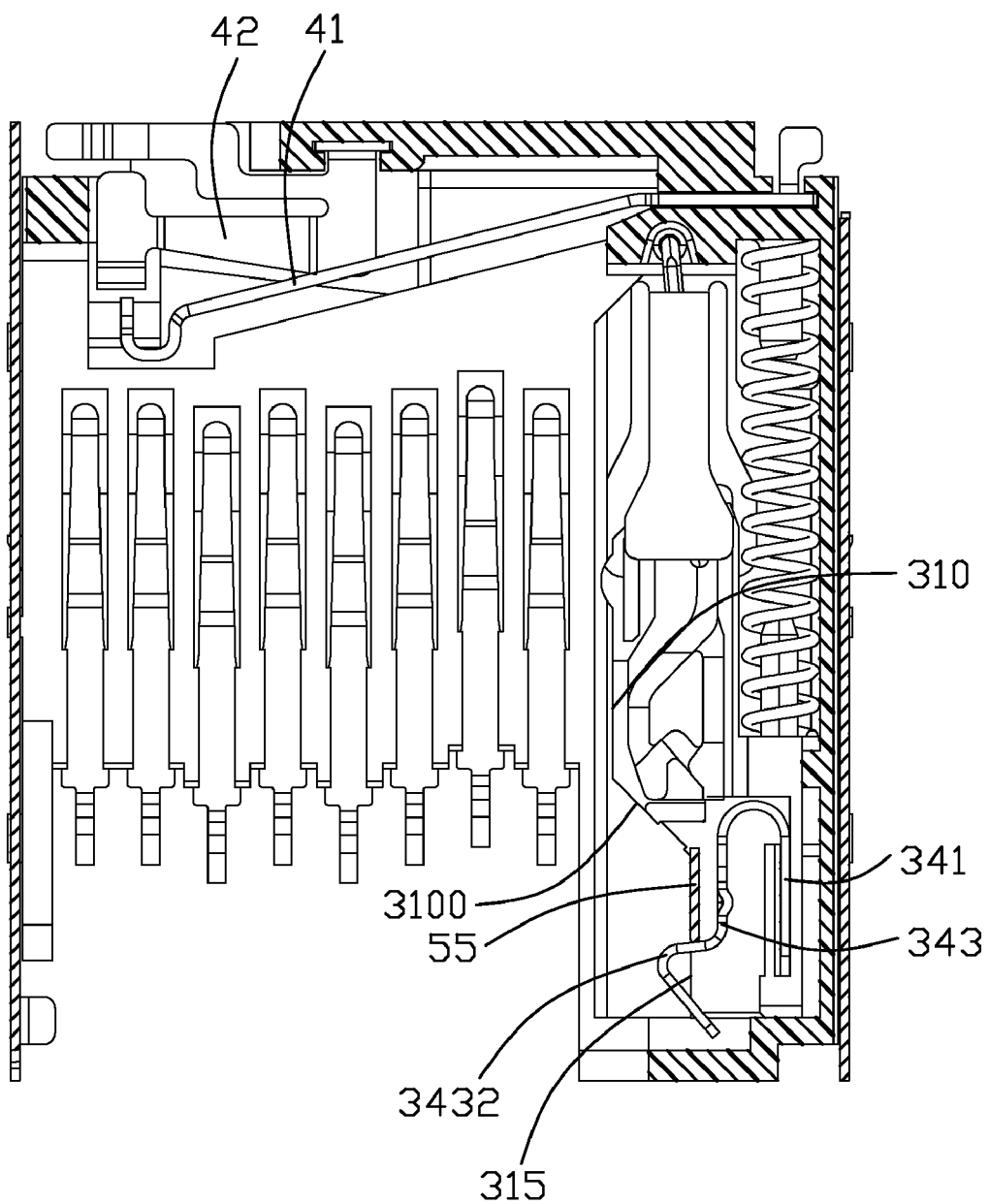
FIG. 5 is a cross-sectional view of the electronic connector shown in FIG. 1.

The metal shell 5 is made of a piece of metal sheet, and comprises a top wall 51 and a pair of side walls 52 bending downwardly from the top wall 51. The side walls 52 define a plurality of apertures 521 engaging with the protrusions 18 of the insulative housing 1. The top wall 51 has a pair of resilient strips 53 extending rearwardly for resisting the electronic card 6, and a slit 54 located at an outer side of the resilient strips 53. The arc tab 344 moves in the slit 54 along the front to back direction. The metal shell 5 has a limiting wall 55 bending vertically and downwardly from an inner side wall of the slit 54. Referring to FIG. 5, the limiting wall 55 extends along the front to back direction and is located at an upper position of the first inner side wall 315, and is located between the apex of the resistive portion 3432 and the arm portion 3431 along the width direction. The limiting wall 55 in the present invention is aligned with the first inner side wall 315 along the up to down direction. Of course, the limiting wall 55 can be disposed between the first inner side wall 315 and arm portion 3431 along the width direction in other embodiments. The limiting wall 55 is disposed at a rear side of the resistive portion 3432, an inner side of the arm portion 3431, a front side of the inclined wall 3100, and.

When the electronic card 6 is inserted into the receiving space 10 normally, one side of the electronic card 6 resists the resistive portion 3432 sidewardly firstly; then the inclined plane 61 pushes the inclined wall 3100 for pushing the slider 31 moving backwardly, the emboss 3102 resists the front side of the electronic card 6 sidewardly for insuring the electronic card 6 moving along the front to back direction and not obliquely, and a rear side of the resistive portion 3432 resists the limiting wall 55 and moves sidewardly and rearwardly; when an user keeps on pushing the electronic card 6 inwardly, the apex of the resistive portion 3432 moves to an outer side of the limiting wall 55, and abuts against an outer side of the limiting wall 55 and moves rearwardly; the limiting wall 55 is located at one side of the electronic card 6 and does not rub with the electronic card 6. When the electronic card 6 is pushed to a predetermined position of the receiving space 10 for transmitting signals with a printed circuit board (not shown), the resistive portion 3432 rebounds into the cutout 62 of the electronic card 6 for locking the electronic card 6 in the receiving space 10.

Figure 6:
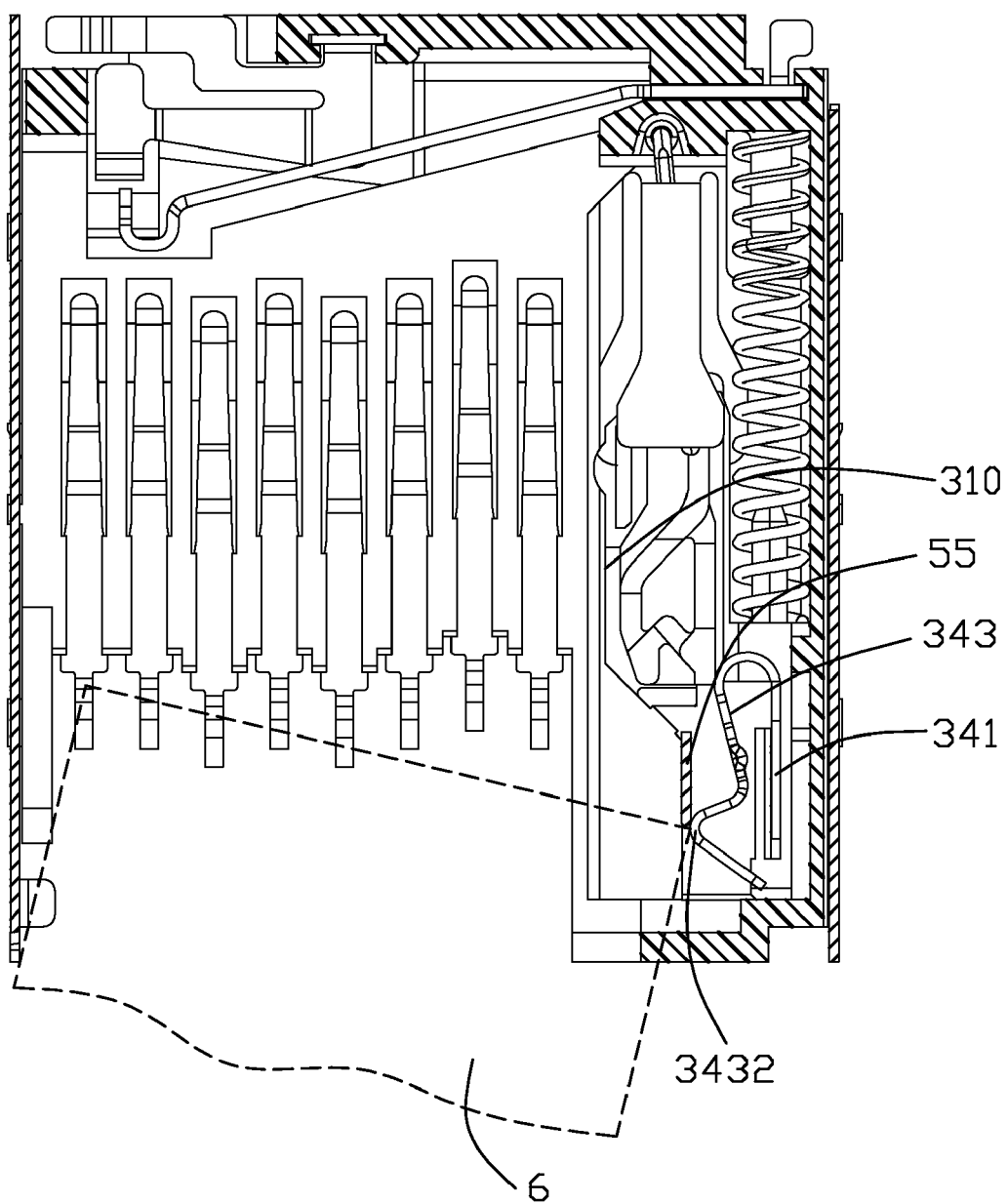
FIG. 6 is cross-sectional view of the electronic connector with the electronic card inserted therein obliquely.

Referring to FIG. 6, when the electronic card 6 is inserted into the receiving space 10 obliquely, a front end of the electronic card 6 resists the resistive portion 3432 sidewardly. When the electronic card 6 is kept on pushing into the receiving space 10 obliquely, the resistive portion 3432 moves to an outer side of the limiting wall 55, and a front end of the limiting wall 55 resists the front end of the electronic card 6 for preventing the electronic card 6 from moving inwardly. Therefore, the spring arm 343 can be protected from resisting overly.

As fully described above, the limiting wall 55 in the present invention is integrally bended downwardly from the metal shell 5 for protecting the spring arm 343 from being resisted overly by the electronic card 6. Of course, the limiting wall 55 can be manufactured solely and retained to the metal shell 5, the insulative housing 1 or the slider 31, which can attain the purpose of the prevent invention also.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. An electronic card connector defining a receiving space for receiving an electronic card, comprising:
   an insulative housing;
   a plurality of contacts retained in the insulative housing;
   an ejecting mechanism comprising a movable slider retained in the insulative housing and a latch strip fixed on the slider, the slider defining a positioning slot, the latch strip having a retention portion retained in the positioning slot and a spring arm extending sidewardly and forwardly, the spring arm having an arm portion and a resistive portion extending sidewardly into the receiving space for locking the electronic card, the resistive portion defining an inner apex which is offset from the arm portion along a width direction of the insulative housing; and
   a metal shell covering the insulative housing and having a limiting wall extending into the receiving space for protecting the spring arm from resisting overly by the electronic card, the limiting wall being located between the inner apex of the resistive portion and arm portion.

2. The electronic card connector as claimed in claim 1, wherein the metal shell has a top wall and a pair of opposed side walls bending downwardly from two sides of the top wall, the limiting wall is bended downwardly from the top wall and extends along the front to back direction.

3. The electronic card connector as claimed in claim 2, wherein the top wall has a pair of resilient strips extending rearwardly and a slit located at an outer side of the resilient strips, the limiting wall is bended downwardly from an inner side wall of the slit.

4. The electronic card connector as claimed in claim 3, wherein the arm portion has an arc tab extending upwardly into the slit and moving in the slit along the front to back direction when the electronic card is inserted into or ejected from the receiving space.

5. The electronic card connector as claimed in claim 1, wherein the limiting wall is located at a rear side of the resistive portion and at an inner side of the arm portion.

6. The electronic card connector as claimed in claim 5, wherein the slider has a first inner side wall, a second inner side wall located at an inner side of the first inner side wall and an inclined wall connecting the first inner side wall and the second inner side wall, the limiting wall is located at an upper position of the first inner side wall.

7. The electronic card connector as claimed in claim 6, wherein the limiting wall is aligned with the first inner side wall along an up to down direction or located between the first inner side wall and the arm portion along the width direction.

8. The electronic card connector as claimed in claim 1, wherein the slider defines an opening extending therethrough along an up to down direction to form a resilient wall, the resilient wall has an emboss extending sidewardly into the receiving space for abutting against the electronic card.

* * * * *